Patented July 6, 1954

2,683,135

UNITED STATES PATENT OFFICE 2,683,135

ESTER AND AMIDE DERIVATIVES OF TETRACARBOXYLIC ACIDS

Herman S. Bloch, Chicago, Ill., assignor to Universal Oil Products Company, Chicago, Ill., a corporation of Delaware No Drawing. Application September 11, 1948, Serial No. 48,933

7 Claims. (Cl. 260—75)

This application is a continuation-in-part of my co-pending application Serial No. 584,505, filed March 23, 1945, now Patent No. 2,450,627, October 5, 1948.

This invention relates to the manufacture of specific derivatives of tetracarboxylic acids formed by the process disclosed in my above copending application which provides a method for the condensation of a dibasic dienophilic acid or its anhydride and a polyolefinic cyclic hydrocarbon to form an adduct thereof and subsequently dimerizing said adduct to form a mixture of said tetracarboxylic acids. More specifically, the present invention concerns a method for the production of certain derivatives of said tetracarboxylic acids comprising the mono- and polyamide and ester derivatives thereof.

The primary starting material or reactant involved in the production of the present product and upon which many of the properties of the final product largely depend, is herein characterized as a tetracarboxylic acid. In my prior application, hereinabove designated, a process is described for the manufacture of said tetracarboxylic acids in which a dibasic acidic dienophile such as maleic acid or its anhydride is condensed by means of a Diels-Alder condensation type of reaction with a polyolefinic cyclic hydrocarbon or a mixture of such hydrocarbons in which the hydrocarbons contain conjugated unsaturation. The latter hydrocarbons are derived from a specific source and are termed "conjunct polymers" by virtue of the fact that they are produced by a particular type of polymerization known to the art as a conjunct polymerization reaction, in which a catalyst capable of causing said conjunct polymerization reaction is contacted with a hydrocarbon generally of an unsaturated type to form a sludge-like material as one product of the reaction. Typical of the catalysts capable of effecting conjunct polymerization of unsaturated hydrocarbons are the various Friedel-Crafts metal halides such as aluminum chloride, aluminum bromide and certain members of the mineral acids, such as concentrated sulfuric acid, substantially anhydrous hydrogen fluoride containing less than 10% water and boron trifluoride as well as others generally known to the art. One of the preferred catalysts of this group comprises substantially anhydrous hydrogen fluoride charged in the process as a liquid at a pressure suitable for maintaining substantially liquid phase. The above catalysts when contacted with a non-aromatic hydrocarbon or hydrocarbon mixture such as a mono- or polyolefin containing at least 3 carbon atoms per molecule or a branched chain paraffin or other organic material capable of reacting during the conjunct polymerization reaction as an unsaturated hydrocarbon, at temperatures of from about 0° to about 200° C., preferably from about 30 to about 100° C. and at pressures sufficient to maintain the reactants in substantially liquid phase, cause conjunct polymerization among the hydrocarbon reactants forming a sludge-like product containing catalyst-hydrocarbon addition complexes as a distinct reaction product of the process. Conjunct polymerization occurs in the mixture of catalyst and hydrocarbons by virtue of a simultaneous polymerization, cyclization and hydrogen transfer reaction between the hydrocarbons to form relatively saturated hydrocarbons as one product of the reaction and an accompanying product comprising high molecular weight polyolefinic cyclic hydrocarbons, generally referred to in the art as conjunct polymers and containing from about 2 to about 4 double bonds per molecule in conjugated as well as non-conjugated relationship to each other. The conjunct polymer hydrocarbons, usually having a molecular weight of from about 250 to about 450 and in some cases up to about 1000, become bound by weak chemical bonds to the conjunct polymerization catalyst to form the sludge hereinabove referred to and may be released therefrom by special methods of decomposition, as for example by heating the sludge in the presence of a sludge decomposition catalyst or in the presence of certain inert hydrocarbon diluents, by hydrolyzing the chemical bonds, as for example, by adding the sludge to water or to a dilute caustic, or they may be recovered by extraction or displacement with a solvent or a more reactive material.

The polyolefinic cyclic hydrocarbon product released upon decomposition of a sludge formed in a conjunct polymerization reaction contains a series of high molecular weight compounds of generally homologous structure, the cyclic portion of the hydrocarbons having a cyclopentenyl structure in which the olefin bond of the cyclopentene ring is in conjugation with an olefinic bond present in an alkenyl or alkapolyenyl side chain. Infra-red and ultra-violet adsorption studies as well as analytical data determined on the recovered conjunct polymers have shown that although the polyenes contained there are cyclic, they are substantially non-aromatic, have isolated unsaturation, in addition to conjugated unsaturation and that the four carbon atoms which constitute the conjugated system are highly substituted, possessing on the average fewer than two hydrogen atoms per mol as substituents. The mixture of polyolefinic cyclic hydrocarbons as recovered from a conjunct polymerization sludge has a wide boiling range of from about 150° to over 450° C., density of from about 0.83 to about 0.93, index of refraction of from about 1.47 to about 1.53, specific dispersion of from about 125 to about 175, bromine numbers above about 140 (although they vary considerably with the average molecular weight), maleic anhydride values of from about 30 to about 90, an acid number below about 3, an average number of olefinic double bonds per molecule of from about 2.5 to about 4 of which from about 40 to about 70% are conjugated, and a molecular weight of from as low as 150 to as high as about 1000, the usual average being in the neighborhood of about 300. The properties of the conjunct polymers vary, of course, with the boiling point of the particular fraction chosen from the material as recovered from the conjunct polymerization sludge. The low boiling fractions are generally monocyclic but non-aromatic and contain shorter chain length side chains than the higher boiling fractions containing hydrocarbons which are generally polycyclic non-aromatic in nature and have longer side chains attached to the cyclic nucleus. Although the entire mixture of conjunct polymers or polyolefinic cyclic hydrocarbons as they are recovered from the sludge may be utilized in the process of preparing the dienophilic adduct thereof, the low boiling fractions are especially preferred in the present process since the latter are generally of lighter color and contain a larger number of conjugated olefinic bonds per unit of weight.

The Diels-Alder condensation product or adducts are formed by reacting a mixture of polyolefinic cyclic hydrocarbons recovered from the sludge formed in the conjunct polymerization reaction as hereinabove described with a dibasic acidic dienophile such as maleic acid or its anhydride in accordance with the technique commonly employed in the general Diels-Alder method of synthesis. As applied to the polyolefinic cyclic hydrocarbon product of a conjunct polymerization reaction as a source of the dienic starting material the process comprises admixing the anhydride of the desired acidic dienophile with the polyolefinic cyclic hydrocarbon product and heating the mixture to a temperature of from about 50° to about 175° C. until a sample of the hydrocarbons recovered from the reaction mixture has a diene value of approximately 0. The proportion of maleic anhydride to hydrocarbons will vary, depending upon the characteristics of the hydrocarbon (that is, its diene number of per cent of conjugated unsaturation), and the end product desired. If the amount of maleic anhydride utilized in the process is equal to or less than the stoichiometric quantity which will react with the conjugated dienic linkages in the hydrocarbon reactant (as shown, for example, by the diene value of the hydrocarbon) and the resulting mixture of adduct and unreacted hydrocarbon is polymerized according to the conditions set forth below, the resultant product comprises a mixture of tetrabasic acids with unreacted polyolefinic cyclic hydrocarbons. It is preferable, however, when a maximum yield of product (tetrabasic acid) is desired, to mix the calculated theoretical quantity of dienophile or a slight excess thereof with a predetermined molecular proportion of the conjunct hydrocarbon material. The correct proportion of reactants in the condensation reaction is determined by calculating the number of mols required on the basis of the number of conjugated linkages and the approximate molecular weight of the hydrocarbons involved in the condensation reaction.

The preparation of the actual tetracarboxylic acids utilized as one of the primary starting materials in the present process is carried out in accordance with the process described in my prior application by the dimerization of the dicarboxylic acid adducts as prepared by the above described Diels-Alder condensation process. The dimerization reaction is essentially a thermal polymerization of the adduct and, although the reaction may be effected by the mere application of heat to the adduct, some decarboxylation as well as other decomposition reactions are likely to occur by this method of preparation. In the preferred alternative process, the thermal treatment is effected in the presence of a sufficient quantity of an aqueous alkaline reagent, preferably a strongly alkaline metal hydroxide to convert the carboxylic acids to their respective salts. The latter alternative effects dimerization of the adduct and hydrolysis of the acid anhydride (when a dibasic dienophilic acid is utilized in the formation of the adduct) with the formation of a tetracarboxylic acid salt of the alkaline reagent in a substantially simultaneous reaction with out substantial decarboxylation of the resulting tetracarboxylic acid groups. The dimerization is, therefore, preferably effected in the presence of an excess of the alkaline reagent, above that required for the formation of the corresponding salts of the tetrabasic acid and the free acids recovered from the aqueous alkaline solution by acidification of the reaction mixture with a strong mineral acid, such as hydrochloric, sulfuric and the like acids. The preferred alkaline reagents in the presence of which the dimerization of the adduct proceeds to substantial completion are the metallic hydroxides of either the alkaline earth or alkali metals, the latter alkali metal hydroxides being preferred in the dimerization because of the greater solubility of their tetrabasic acid salt in water, and of these potassium hydroxide and sodium hydroxide are considered the preferred members. Reaction temperatures of from about 100° to about 350° C. result in dimerization, although temperatuers of from about 200° to about 250° C. are preferred. The concentration and the amount of the aqueous alkaline reagent may be just sufficient for complete neutralization of the acid adduct or, on the other hand, it may be sufficient to provide several equivalents of the alkali. In general, a substantial excess of the alkali, up to about 10 times the number of equivalents of the resulting tetrabasic acids, is preferred.

Although in general, the art has disclosed tetrabasic acids as limited to specific members of this class of compounds, the tetrabasic acids involved herein are of novel structure and constitution; the art contains no suggestion of the new composition described in the instant disclosure. As hereinabove stated, the hydrocarbons comprising the mixture of conjunct polymers recovered from a sludge formed in a conjunct polymerization reaction are polyolefinic cyclic hydrocarbons containing conjugated unsaturation wherein part of the conjugated system of double bonds are within the cyclic portion of the hydrocarbon molecules, such that on condensation with an acidic dienophile and the subsequent dimerization of the adduct, a polycyclic tetracarboxylic acid is formed by a reaction mechanism similar to the following equation, representing the typical structure of reactants and products involved in the formation of the tetracarboxylic acid intermediate:

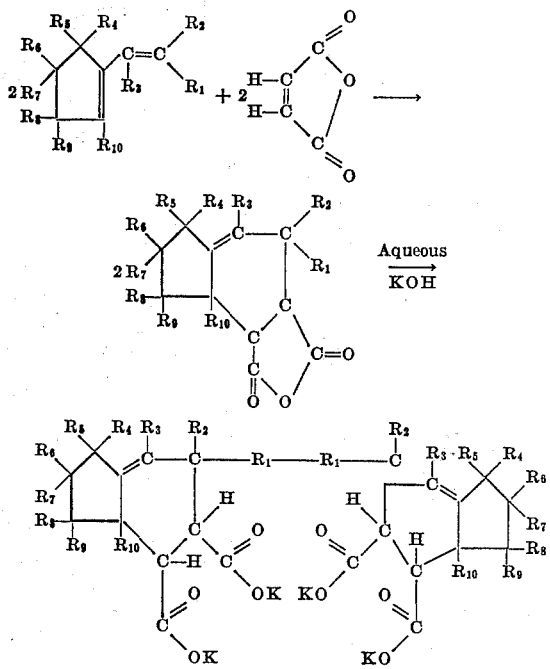

where the radicals $R_2$ to $R_{10}$ are selected from the group consisting of hydrogen and alkyl, alkenyl, and alkapolyenyl hydorcarbon radicals, at least two of the substituents $R_4$ to $R_{10}$ are hydrocarbon radicals, not more than two of the groups $R_1$, $R_2$, $R_3$, $R_{10}$ represent hydrogen, and the group $R_1$ in the hydrocarbon and dibasic acid compounds represents an unsaturated hydrocarbon radical. The resulting acidic compound as represented by the structural formula on the right of the reaction equation therefore contains a number of rings at least equal to the number of carboxyl groups and at least two of these rings are five-membered rings (from the polyolefinic cyclic hydrocarbon reactant). Utilizing a dienophile in the adduct-forming stage which contains two carboxylic acid groups per molecule, as specified herein, and containing a single dienophilic double bonded pair of carbon atoms, the resulting tetracarboxylic acid product contains at least two five-membered rings and at least two six-membered rings. The tetracarboxylic acids herein considered are therefore to be distinguished structurally from the typical tetracarboxylic acids disclosed by the art, for example, those formed by the polymerization of a terpenic hydrocarbon with a dienophilic acid wherein the polymer contains a multiplicity of dienophilic acid groups; that is, where the polymer is of high molecular weight, contains no five-membered rings and wherein the number of six-membered rings contained within the adduct polymer is equal to one-half the total number of carboxylic acid groups likewise contained therein. The latter, furthermore, do not contain any condensed ring systems of five or six-membered rings. The tetracarboxylic acid starting materials herein specified is designated as a product containing at least two five-membered rings and at least two six-membered rings. Thus, if the original hydrocarbon conjunct polymer contains a bicyclic system, for example, two cyclopentyl rings, the dimer of the resulting adduct thereof will contain four five-membered rings and two six-membered rings.

It is one object of the present invention to provide a source of reactants utilizable in the preparation of resins, plasticizers, high boiling solvents, air-hardening, polymerizable drying fluids and heat-hardening resinous products useful in the coatings and resins art.

Another object of the invention is to provide polyfunctional tetracarboxylic acid derivatives selected from the polycarboxamides and polycarboxylic acid ester derivatives which may be varied over a broad range of physical and chemical properties to obtain products adaptable to numerous and variable uses.

The invention in one of its broad aspects relates to a process for the production of compounds of the type represented structurally by the empirical formula:

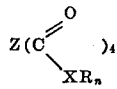

where Z is a hydrocarbon radical of valence 4 representing the hydrocarbon residue of the dimerized condensation product of a conjunct polymer and a dibasic acidic dienophile, X is selected from the group consisting of oxygen and nitrogen, R is a substituent selected from the group consisting of the radicals: hydrogen, alkyl, alkenyl, alkapolyenyl, aryl, aralkyl, naphthenyl, hydroxyalkyl, hydroxyaryl, aminoalkyl, and aminoaryl, comprising the hydrogen residue of a carboxylic acid group or amide group or the organic alcohol or amine residue of an ester or an amide group, and $n$ is a whole number having a value of one when X is oxygen and two when X is nitrogen, the two R groups not necessarily being identical when $n$ is two.

Another broad aspect of the invention encompasses the polyester and polyamide compounds formed when the tetracarboxylic acids herein described are caused to react with polyhydric alcohols, polyamino compounds, or amino alcohols containing two or more functional groups capable of reacting with carboxylic acid groups. Hard, resinous products of the thermosetting type can be produced from these tetracarboxylic acids and bifunctional reactants of the alcohol and amine type; whereas with dibasic acids, reactants having at least three functional groups (such as, for example, glycerol) are required for the production of thermosetting resinous products.

In accordance with a more specific embodiment thereof the present invention relates to a composition of matter consisting of an alcohol polyester of a tetracarboxylic acid formed by the dimerization of an acidic dienophilic adduct of a mixture of polyolefinic cyclic hydrocarbons containing conjugated olefinic unsaturation and recovered from a sludge formed in a conjunct polymerization reaction.

Another embodiment of the invention relates to a composition of matter consisting of a glycol polyester of a tetracarboxylic acid formed by the dimerization of an acidic dienophilic adduct of a mixture of polyolefinic cyclic hydrocarbons containing conjugated olefinic unsaturation and recovered from a sludge formed in a conjunct polymerization reaction.

Still another embodiment of the invention relates to a composition of matter consisting of a diamine polyamide of a tetracarboxylic acid formed by the dimerization of an acidic dienophilic adduct of a mixture of polyolefinic cyclic hydrocarbons containing conjugated olefinic unsaturation and recovered from a sludge formed in a conjunct polymerization reaction.

A further embodiment of the invention relates to a composition of matter consisting of a carboxamide of a tetracarboxylic acid formed by the dimerization of an acidic dienophile adduct of a mixture of polyolefinic cyclic hydrocarbons containing conjugated olefinic unsaturation and recovered from a sludge formed in a conjunct polymerization reaction.

Other objects and embodiments of the present invention relating to specific reactants and to methods of preparing said esters and amides of said tetracarboxylic acids will be referred to in greater detail in the following further description of the invention.

The alcohols utilizable in the present process for the preparation of esters of the tetracarboxylic acids hereinabove referred to and described include both the mono-, and polyhydric classes and the saturated as well as unsaturated types; the particular choice will depend upon the properties desired of the ultimate product and the intended use to be made of the resulting ester. The polyhydric alcohols, for example, yield esters which when subjected to heat treatment are thermosetting and yield an alkyd type of resin by virtue of the cross-linking between the free carboxyl groups of one polyester molecule with the hydroxyl groups of another polyester molecule partially esterified. The tendency to cross-link during the esterification reaction is especially pronounced with the trihydric alcohols and more highly hydroxyl-substituted alcohols. The monohydric alcohol monoesters of the present reactants, especially of the long chain aliphatic alcohols, react further with polyhydric alcohols to form completely esterified products which are capable of forming resinous materials under similar heat treatment and the final resinous products are still thermosetting. When esterified with saturated monohydric alcohols, the present tetracarboxylic acids form products useful as plasticizers and high boiling solvents, the product usually being a highly viscous liquid or a semi-solid product such as a wax-like material, depending upon the chain length of the monohydric alcohol. The unsaturated monohydric alcohols form the so-called "inverse" drying oil type of esters with the present tetracarboxylic acids which when subjected to exposure with atmospheric oxygen, polymerize through the unsaturated linkages on both the hydrocarbon portion of the alcohol reactant and the residual unsaturated olefinic linkages of the initial conjunct polymer hydrocarbon reactant incorporated in the acid. A further variation in properties of the ester product herein provided may be obtained by partially esterifying (for example, to the diester stage) the tetracarboxylic acid with a monohydric alcohol, especially a long chain alcohol containing more than 10 carbon atoms per molecule, and thereafter completing the esterification reaction with a glycol or trihydric alcohol to form polyesters which are initially soluble in organic solvents, but which upon air drying or further heating form insoluble resinous materials. The initial polyester may also be converted to thermoplastic resinous products by careful regulation of the monohydric alcohol to dihydric alcohol ratio.

The compositions of matter herein referred to as "esters" are compounds which may be considered to be derived from intermediates of the type having empirical formulae of the general structure:

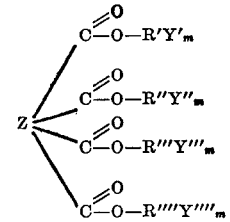

where Z is a tetravalent hydrocarbon radical corresponding to the hydrocarbon residue of the dimerized condensation product of the polyolefinic cyclic hydrocarbon and the dibasic acidic dienophile heretofore described, each of the R groups of the above formula is a bivalent or polyvalent residue of the alcohol reactant or the hydrogen atom of a carboxylic acid group, each of the Y groups is selected from the group consisting of hydrogen, amino and hydroxyl groups, and $m$ is a whole number having a value of from 0 to 5 inclusive, such that when R is hydrogen, $m$ is zero. When a polyhydric alcohol is utilized in the esterification reaction, it may be considered that the unreacted residue of the alcohol may thus contain nonesterified hydroxyl groups which are capable of inter-esterification with free, non-reacted carboxylic acid groups present in the original tetrabasic acid upon subsequent thermal treatment to effect esterification thereof. The resulting inter-esterified products between adjacent groups or groups attached to other molecules of tetrabasic acid provide for the production of unique alkyd resinous materials having varying properties depending upon the reactants selected in the preparation thereof. Since any of the "R" substituents of the formula may be hydrogen, the formula accounts for the partially esterified tetracarboxylic acid derivatives where one or more free carboxyl groups may remain in the final esterification product. Since the compounds herein specified are always esters or amides, the partially esterified product thus contains at least one carboxylic acid group which is esterified.

The alcohols utilizable in the esterification reaction of the present process may be aliphatic, aromatic, alkenylic, and naphthenic (that is, the alcohols may contain cycloalkyl and cycloalkenyl hydrocarbon residues attached to the hydroxyl group or groups) and may contain from 1 to 6 hydroxyl groups per molecule as well as other groups which are non-functional in the esterification reaction, such as halo, nitro, carbonyl, nitrile, and other radicals. Typical representative alcohols of the type hereinabove mentioned include such compounds as methyl alcohol, 2-ethyl-hexanol, lauryl alcohol, stearyl of the saturated monohydric alcohols and vinyl alcohol, allyl alcohol, crotyl alcohol, oleyl alcohol, linoleyl alcohol, cinnamyl alcohol of the unsaturated monohydric alcohol series and ethylene glycol, diethylene glycol, propylene glycol, decamethylene glycol, ricinoleyl alcohol, etc. of the saturated and unsaturated dihydric alcohol series. Typical of the polyhydric alcohols are such compounds as glycerol, mannitol, sorbitol, inositol, quercitol, pentaerythritol, etc. The above comprises merely a partial enumeration of the alcohols utilizable in the preparation of the present tetracarboxylic acid ester species of product and no intention is thereby intended to exclude the various alternative reactants in the species mentioned.

The esterification reaction for the production of the present alcohol esters is effected by reacting the desired alcohol or mixture of alcohols with the previously formed tetracarboxylic acid at conditions resulting in the reaction of the carboxylic acid group and hydroxyl group of the alcohol to form the ester linkage with the simultaneous liberation of water from the reaction mixture. Although the reaction usually proceeds to substantial completion by merely heating the respective reactants at a reactive temperature, the esterification may be enhanced and effected in a shorter reaction period by conducting the esterification reaction in the presence of catalysts which provide a definite hydrogen ion concentration in the reaction mixture, such catalysts including the mineral acids, preferably as a dilute aqueous solution thereof. Usually, about from 1 to about 5% of the reaction mixture of a 1 N aqueous solution of hydrochloric acid, sulfuric acid, phosphoric acid or an organic sulfonic acid, such as toluene sulfonic acid, is sufficient to provide a pronounced catalytic effect. The esterification is effected at temperatures of from about 75° to about 200° C. preferably from about 100° to 150° C. Where an anhydrous reaction mixture is desired, the water as a by-product of the reaction may be eliminated from the reaction mixture by conducting the esterification in the presence of a solvent which refluxes at the reaction temperature and forms an azeotrope with the liberated water. The latter azeotrope may be withdrawn, separated from the water it contains and recycled to the conversion reaction. Suitable solvents include certain hydrocarbons such as benzene, ethers, such as di-isopropyl ether and other water-azeotrope forming substances.

The carboxamide derivatives of the tetrabasic reactant provided in the present process may be regarded as being derived from an intermediate represented by the empirical formula:

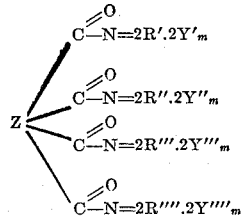

or the compound represented by the replacement of up to three of the N=2R2Y$_m$ groups with an hydroxyl group, representing a partially amidized tetrabasic acid. The groups: Z, R, Y and $m$ have the same designation and value as hereinabove specified for the tetrabasic acid esters. The compositions of matter herein referred to as carboxyamides may thus be the simple amides containing one or more

groups or the mono- or di-substituted amides in which one or both hydrogen atoms of the amido group are replaced by a substituent selected from the alkyl, alkenyl, alkapolyenyl, aryl, aralkyl or naphthenyl radicals, which may be further substituted by additional amino or hydroxyl radicals up to 5 in number or such non-functional groups as halo, nitro, carbonyl, etc. groups. When unsaturated substituents are attached to the nitrogen atom, such as alkenyl or alkapolyenyl groups, the compounds are capable of further polymerization or inter-polymerization to yield high molecular weight amides which are useful as resins, etc. Similar products are formed which are of resinous character when the "R" group contains amino or substituted amino radicals. The latter are capable of condensing with non-amidized carboxyl groups of the original tetrabasic acid to form inter-amidized products.

Typical amines which may be reacted with the tetrabasic acid reactant to form the present amides as novel compositions of matter include ammonia, methylamine, ethylamine, propylamine, dimethylamine, etc. of the alkylamine species; ethylene diamine, diethylenetriamine, melamine, etc., of the polyamines, propenylamine, butenylamine, (crotylamine), octadecenyl and octadecadienyl amines, dibutenylamine, butadienylamine, hexadienylamine, etc. of the alkenyl and alkapolyenyl mono- and diamines; aniline, toluidine, phenylenediamine, benzidene, etc. of the arylamines; benzylamine, etc. of an arylalkylamine; and cyclohexylamine of the naphthenic amino derivatives. Typical of the reactants containing other functional or non-functional groups is represented by the alkanol amines, such as ethanolamine and diethylanolamine.

The present amide derivatives of the tetrabasic acid reactant may be prepared by merely heating an amine or ammonia with the tetrabasic acid until approximately one molecule of water has been eliminated for each carboxylic acid and amino group in the reactants. This method is satisfactory for the preparation of most of the present carboxamide derivatives, especially the amides of saturated amines and low molecular weight members of this group. The amidization reaction may be made to proceed in two stages, the first (which may be carried out at room temperature or slightly elevated temperatures) corresponding to salt formation between the amine and the tetracarboxylic acids, and the second (which generally proceeds smoothly in the range of about 100°–200° C.) corresponding to the conversion of the salts to the amides.

In some cases, however, the amidization reaction proceeds somewhat more rapidly and the yield is increased when the condensation of the amine and tetrabasic acid is effected in the presence of a catalyst of the acid-acting type, such as mineral acid. The acid is generally present in the reaction mixture in amounts ranging from about 0.1 to about 5% by weight of the reaction mixture, at a concentration of from about 1 to about 10 normality. The condensation and elimination of water is effected at temperatures within the range of from about 50° to about 250° C. and may be carried out in the presence of a suitable solvent or diluent which may be selected from the volatile organic compounds capable of forming an azeotrope with the water produced by the amidization reaction. The acidic catalyst may be subsequently removed from the product by digesting the matter with a dilute aqueous solution of a mildly basic reactant, if desired.

The invention is further illustrated in the following examples which are presented for the purposes of exemplifying the types of reactants, the nature of the product and the method of effecting the preparation of the present ester or amide derivatives of the tetrabasic acid reactant provided herein, but with no intention, however, of unduly limiting the scope of the invention in accordance thereto.

Example I

A mixture of conjunct hydrocarbon polymers having a high diene value was prepared by the following procedure:

22 liters (16.5 kg.) of non-selective polymer gasoline having a bromine number of about 162, an initial boiling point of 45° C., and an end boiling point of 236° C. was charged into a pressure autoclave and rapidly stirred as 9.0 kg. of liquid anhydrous hydrogen fluoride was introduced into the autoclave. The pressure was maintained throughout the reaction at an average value of about 205 pounds per square inch by means of compressed nitrogen. The temperature was increased to 91° C. and stirring was continued for an additional one hour. The reaction mixture following the above period of reaction and upon standing quiescent for several minutes separated into two phases: an upper saturated hydrocarbon layer and a lower acidic layer. The lower acidic layer was withdrawn and weighed 16.1 kg. after removal of entrained "upper layer" by extracting the acid sludge with liquid pentane and was a light brown mobile fluid having a density of 0.98 to 4° C.

The above hydrogen fluoride sludge may be decomposed by several alternative procedures for the recovery of a mixture of polyolefinic cyclic hydrocarbons having a high degree of conjugated unsaturation. In accordance with one of these methods, the so-called hydrolytic method of decomposition, for the recovery of a high diene value hydrocarbon suitable for use as a charging stock in the subsequent examples, the sludge is added to a quantity of water which dissolved the hydrogen fluoride catalyst from the sludge and liberates the mixture of conjunct polymers which floats on the surface of the aqueous hydrofluoric acid solution. In accordance with this procedure, 2000 grams of the sludge as prepared above was allowed to flow into a mixture of ice and water, additional ice being added as the heat of the hydrolysis reaction melted the ice. 868 grams of a light-colored, sweet smelling oil separated from the aqueous phase which on examination had the following physical properties.

| | |
|---|---|
| Boiling range ° C | 160–400 |
| Density, $d_4^{20}$ | 0.863 |
| Refractive index $n_D^{20}$ | 1.4871 |
| Molecular weight | 263 |
| Diene number | 85 |
| Bromine number | 195 |
| Double bonds per molecule (average) | 3.2 |

The polyolefinic cyclic hydrocarbon oil thus recovered was vacuum-fractionated and fraction boiling at 275–325° C. (at atmospheric pressure) was utilized in the preparation of a maleic acid adduct. This fraction had the following properties:

| | |
|---|---|
| Density, $d_4^{20}$ | 0.856 |
| Refractive index, $n_D^{20}$ | 1.4829 |
| Molecular weight | 257 |
| Diene number | 78.5 |
| Bromine number | 202 |
| Double bonds/mol (av.) | 3.2 |
| Conjugated bonds/mol (av.) | 1.6 |

A mixture comprising 773 g. (3 moles) of this fraction and 515 g. (5.25 moles) of maleic anhydride (1:1.75 mol ratio) was heated at 120° C. for 5 hours to effect the formation of the maleic adduct, and the product was heated with a solution of 523 g. of sodium hydroxide in 2.5 liters of water at 90–100° C. for 4 hours to convert the acids to their sodium salts. The alkaline solution was repeatedly extracted with petroleum ether to remove unreacted neutral oil (alcohol being added to facilitate the separation of layers and reduce emulsification,) and the oil-free alkaline solution was then neutralized and made acid with an excess of hydrochloric acid. The excess maleic acid remained in solution; the adduct acids separated as a light yellow taffy-like solid, which was washed repeatedly with water and then dried. A yield of 965 g. of dibasic acids of neutralization equivalent 395 was obtained. (It has been found that one carboxyl group of these dibasic acids is so weakly acidic that, at the phenolphthalein end point employed in the neutralization equivalent determination, only one carboxyl group is neutralized, thus making the apparent neutralization equivalent equal to the molecular weight.)

In the dimerization of these dibasic acids, 675 g. of the latter were heated with 1250 g. of 50% aqueous potassium hydroxide in a sealed glass vessel for 16 hours at 178° C. The alkaline solution was leached from the glass vessel (which had been partly dissolved by the caustic) with water, extracted several times with petroleum ether to remove neutral oil formed by the partial decomposition of the maleic adduct, and then neutralized with an excess of hydrochloric acid. The precipitated tetrabasic acids were extracted from the siliceous solution with diethyl ether, the latter removed by warming, and the recovered acids then dried. A yield of 504 g. of solid, light yellow acids of molecular weight 820 and neutralization equivalent 210 was obtained. (It should be noted that the dimerization of the dibasic acids produces a tetrabasic acid in which all four carboxyl groups are acidic enough for neutralization at the phenolphthalein end point).

An alkyd resin was prepared from these tetracarboxylic acids and a glycol as follows: 166 g. (0.2 mol, 0.8 equivalent) of the above acids and 25 g. (0.4 mol, 0.8 equivalent) of ethylene glycol were heated in an atmosphere of nitrogen and in the absence of a catalyst for 5 hours at 180–190° C. At the end of this time, the product was a yellowish, homogeneous, viscous fluid when hot, and cooled to a soft solid. Further heating converted it to a hydrocarbon-insoluble, hard resin.

When the same components were heated under the same conditions but in a mol ratio of 1 tetracarboxylic acid to 14 ethylene glycol, the product, after removal of the excess ethylene glycol by water-washing, was a viscous syrupy fluid readily soluble in most organic solvents and suitable, by virtue of its high molecular weight and non-volatility, for use as a plasticizer.

Example II

A polyamide was prepared as follows: To 82 g. of the tetrabasic acids of Example I, maintained in a flask externally heated to 170° C. and fitted with a reflux condenser, were added, drop by drop, 12 g. of ethylene diamine. An atmosphere of nitrogen was maintained in the flask throughout the preparation. After the initial reaction had subsided, the reflux condenser was removed and the temperature was raised gradually to 250° C., this temperature being maintained for 10 hours. The product, upon cooling, was a hard, insoluble resin. A material prepared similarly with an equivalent amount of hexamethylenediamine instead of ethylene diamine remained soluble in toluene after two hours of heating, but became gradually more insoluble thereafter.

I claim as my invention:

1. As a composition of matter, a tetracarboxylic acid derivative selected from the group consisting of the esters and amides of a tetrabasic acid which is the dimer of the adduct of a dienophilic dibasic acidic compound and a cyclic polyolefinic hydrocarbon fraction having a boiling range of from about 150° C. to about 450° C., a density of from about 0.83 to about 0.93, an index of refraction of from about 1.47 to about 1.53, a specific disperson of from about 125 to about 175, a bromine number above about 140, a maleic anhydride value of from about 30 to about 90, an acid number below 3, and an average number of olefinic double bonds per molecule of from about 2.5 to about 4 of which from about 40 to about 70% are conjugated, said derivative of the tetrabasic acid being a tetracarboxy-substituted, poly-unsaturated hydrocarbon containing two six-membered rings and from two to four five-membered rings.

2. As a composition of matter, a tetracarboxylic acid derivative selected from the group consisting of the esters and amides of a tetrabasic acid which is the dimer of the adduct of maleic anhydride and a cyclic polyolefinic hydrocarbon fraction having a boiling range of from about 150° C. to about 450° C., a density of from about 0.83 to about 0.93, an index of refraction of from about 1.47 to about 1.53, a specific dispersion of from about 125 to about 175, a bromine number above about 140, a maleic anhydride value of from about 30 to about 90, an acid number below 3, and an average number of olefinic double bonds per molecule of from about 2.5 to about 4 of which from about 40 to about 70% are conjugated, said derivative of the tetrabasic acid being a tetracarboxy-substituted, poly-unsaturated hydrocarbon containing two six-membered rings and from two to four five-membered rings.

3. An alcohol polyester of a tetrabasic acid which is the dimer of the adduct of a dienophilic dibasic acidic compound and a polyolefinic cyclic hydrocarbon fraction having a boiling range of from about 150° C. to about 450° C., a density of from about 0.83 to about 0.93, an index of refraction of from about 1.47 to about 1.53, a specific dispersion of from about 125 to about 175, a bromine number above about 140, a maleic anhydride value of from about 30 to about 90, an acid number below 3, and an average number of olefinic double bonds per molecule of from about 2.5 to about 4 of which from about 40 to about 70% are conjugated, said derivative of the tetrabasic acid being a tetracarboxy-substituted, poly-unsaturated hydrocarbon containing two six-membered rings and from two to four five-membered rings.

4. A glycol polyester of a tetrabasic acid which is the dimer of the adduct of a dienophilic dibasic acidic compound and a polyolefinic cyclic hydrocarbon fraction having a boiling range of from about 150° C. to about 450° C., a density of from about 0.83 to about 0.93, an index of refraction of from about 1.47 to about 1.53, a specific dispersion of from about 125 to about 175, a bromine number above about 140, a maleic anhydride value of from about 30 to about 90, an acid number below 3, and an average number of olefinic double bonds per molecule of from about 2.5 to about 4 of which from about 40 to about 70% are conjugated, said derivative of the tetrabasic acid being a tetracarboxy-substituted, poly-unsaturated hydrocarbon containing two six-membered rings and from two to four five-membered rings.

5. A diamine polyamide of a tetrabasic acid which is the dimer of the adduct of a dienophilic dibasic acidic compound and a polyolefinic cyclic hydrocarbon fraction having a boiling range of from about 150° C. to about 450° C., a density of from about 0.83 to about 0.93, an index of refraction of from about 1.47 to about 1.53, a specific dispersion of from about 125 to about 175, a bromine number above about 140, a maleic anhydride value of from about 30 to about 90, an acid number below 3, and an average number of olefinic double bonds per molecule of from about 2.5 to about 4 of which from about 40 to about 70% are conjugated, said derivative of the tetrabasic acid being a tetracarboxy-substituted, poly-unsaturated hydrocarbon containing two six-membered rings and from two to four five-membered rings.

6. A carboxamide of a tetrabasic acid which is the dimer of the adduct of a dienophilic dibasic acidic compound and a polyolefinic cyclic hydrocarbon fraction having a boiling range of from about 150° C. to about 450° C., a density of from about 0.83 to about 0.93, an index of refraction of from about 1.47 to about 1.53, a specific dispersion of from about 125 to about 175, a bromine number above about 140, a maleic anhydride value of from about 30 to about 90, an acid number below 3, and an average number of olefinic double bonds per molecule of from about 2.5 to about 4 of which from about 40 to about 70% are conjugated, said derivative of the tetrabasic acid being a tetracarboxy-substituted, poly-unsaturated hydrocarbon containing two six-membered rings and from two to four five-membered rings.

7. An ethylene glycol ester of a tetrabasic acid which is the dimer of the adduct of maleic anhydride and a cyclic polyolefinic hydrocarbon fraction having a boiling range of from about 150° C. to about 450° C., a density of from about 0.83 to about 0.93, an index of refraction of from about 1.47 to about 1.53, a specific dispersion of from about 125 to about 175, a bromine number above about 140, a maleic anhydride value of from about 30 to about 90, an acid number below 3, and an average number of olefinic double bonds per molecule of from about 2.5 to about 4 of which from about 40 to about 70% are conjugated, said derivative of the tetrabasic acid being a tetracarboxy-substituted, poly - unsaturated hydrocarbon containing two six-membered rings and from two to four five-membered rings.

References Cited in the file of this patent

UNITED STATES PATENTS

| Number | Name | Date |
|---|---|---|
| 2,155,639 | Bradley | Apr. 25, 1939 |
| 2,240,006 | Peterson | Apr. 29, 1941 |
| 2,387,830 | Butz | Oct. 30, 1945 |
| 2,391,943 | Butz | Jan. 1, 1946 |
| 2,450,627 | Bloch | Oct. 5, 1948 |

FOREIGN PATENTS

| Number | Country | Date |
|---|---|---|
| 810,125 | France | Mar. 15, 1937 |